(12) United States Patent
Luong et al.

(10) Patent No.: US 10,621,135 B2
(45) Date of Patent: Apr. 14, 2020

(54) SYSTEM AND METHOD OF MANAGING SIGNALS IN INFORMATION HANDLING SYSTEMS

(71) Applicant: Dell Products L.P., Round Rock, TX (US)

(72) Inventors: Anh Dinh Luong, Austin, TX (US); Jeffrey Leighton Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 187 days.

(21) Appl. No.: 15/963,739

(22) Filed: Apr. 26, 2018

(65) Prior Publication Data

US 2019/0332565 A1    Oct. 31, 2019

(51) Int. Cl.
| | |
|---|---|
| *G06F 13/36* | (2006.01) |
| *G06F 9/445* | (2018.01) |
| *G06F 13/42* | (2006.01) |
| *G06F 13/40* | (2006.01) |

(52) U.S. Cl.
CPC .......... *G06F 13/4282* (2013.01); *G06F 9/445* (2013.01); *G06F 13/36* (2013.01); *G06F 13/4068* (2013.01); *G06F 2213/0026* (2013.01)

(58) Field of Classification Search
CPC ... G06F 13/36; G06F 2213/0026; G06F 9/445
See application file for complete search history.

(56) References Cited

U.S. PATENT DOCUMENTS

| | | | | |
|---|---|---|---|---|
| 2013/0031390 | A1* | 1/2013 | Smith, III ............... | G06F 1/206 |
| | | | | 713/320 |
| 2017/0010993 | A1* | 1/2017 | Pearson .............. | G06F 13/1678 |
| 2017/0351640 | A1* | 12/2017 | Nilange .............. | G06F 15/7814 |
| 2018/0129270 | A1* | 5/2018 | Garg ........................ | G06F 1/325 |

OTHER PUBLICATIONS

Implementing PCIe Reset Sequence in SmartFusion2 and IGLOO2 Devices—Libero SoC v11.6, Microsemi Corporation, Nov. 2015; 32 pages.

(Continued)

*Primary Examiner* — Zachary K Huson
(74) *Attorney, Agent, or Firm* — Baker Botts L.L.P.

(57) ABSTRACT

In one or more embodiments, one or more systems, methods, and/or processes may receive a first signal from information handling system firmware; may provide, based at least on the first signal, each of first multiple reset assertion signals to each of respective multiple Peripheral Component Interconnect Express (PCIe) risers, each of the multiple PCIe risers including multiple PCIe slots; may receive second multiple reset assertion signals from respective multiple dies, each of the multiple dies includes at least one processing core and at least one PCIe root complex; may receive a second signal from the information handling system firmware; may determine that the second multiple reset assertion signals and the second signal were received; and may, after determining that the second multiple signals and the second signal were received, provide each of third multiple reset de-assertion signals to a respective PCIe riser of the multiple PCIe risers.

20 Claims, 5 Drawing Sheets

(56) References Cited

OTHER PUBLICATIONS

Chandana, K. N., and R. K. Karunavathi. "Link Initialization and Training in MAC Layer of PCIe 3.0." *International Journal of Computer Science and Information Technologies* 6.3 (2015): 2717-2719; 3 pages, 2015.
Coherent Accelerator Interface Architecture, OpenPower Foundation Version 1—Workgroup Specification, Revision 1.0.0, (Feb. 17, 2016); 165 pages.
Landsman, David et al. "Power-up Requirements for PCIc side bands (PERST#, etc.)" PCI SIG, Sep. 18, 2014; 6 pages.

\* cited by examiner

SYSTEM AND METHOD OF MANAGING SIGNALS IN INFORMATION HANDLING SYSTEMS

BACKGROUND

Field of the Disclosure

This disclosure relates generally to information handling systems and more particularly to synchronizing signals in information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may receive a first signal from information handling system firmware; may provide, based at least on the first signal, each of first multiple reset assertion signals to respective multiple Peripheral Component Interconnect Express (PCIe) risers, each of the multiple PCIe risers including multiple PCIe slots; may receive second multiple reset assertion signals from respective multiple dies, each of the multiple dies includes at least one processing core and at least one PCIe root complex; may receive a second signal from the information handling system firmware; may determine that the second multiple reset assertion signals and the second signal were received; and may, after determining that the second multiple signals and the second signal were received, provide each of third multiple reset de-assertion signals to a respective PCIe riser of the multiple PCIe risers. In one or more embodiments, the information handling system firmware may write information to a register. For example, receiving the first signal from information handling system firmware may include the circuitry receiving the information from the register. In one or more embodiments, at least two of the multiple PCIe slots may be coupled to respective at least two root complexes of respective at least two dies of the multiple dies. In one or more embodiments, the information handling system firmware may initiate an operating system. For example, the information handling system firmware may provide information, based at least on a configuration of couplings of the multiple dies to the multiples risers, to the operating system. In one or more embodiments, providing each of the third plurality of reset de-assertion signals to the respective PCIe riser of the multiple PCIe risers may include substantially synchronously providing each of the third plurality of reset de-assertion signals to the respective PCIe riser of the multiple PCIe risers. In one or more embodiments, receiving the second multiple reset assertion signals from the multiple dies, respectively, may include receiving at least two of the second multiple reset assertion signals from the multiple dies at two different times, respectively.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
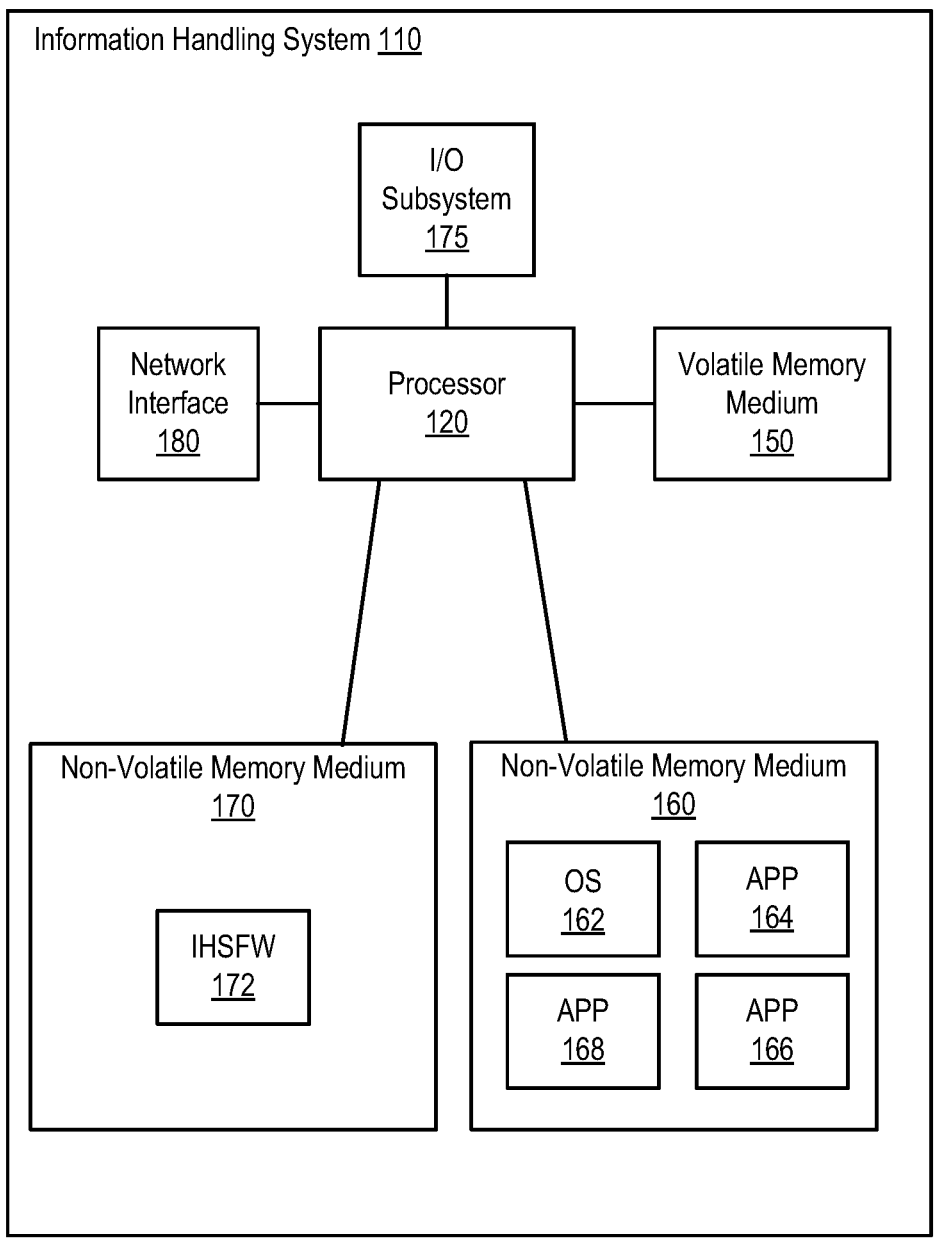
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a processor socket may include multiple dies. For example, a die may include one or more processor cores. For instance, a die may include one or more Peripheral Component Interconnect Express (PCIe) root complexes. In one or more embodiments, an initialization method and/or process may include asserting a PCIe reset (PERST) signal. For example, a die may assert a PERST signal. For instance, a die may assert a PERST signal for link purposing. In one or more embodiments, link purposing may include configuring and/or setting a PHY (e.g., circuitry that implements physical layer functions of a physical layer of an Open Systems Interconnection model). For example, a PHY may be configured and/or set for a serial advanced technology attachment (SATA) interface, a PCIe interface, an Ethernet interface, or a Global Memory Interconnect (GMI), among others. In one or more embodiments, an initialization method and/or process may include link training. For example, a die may de-assert a PERST signal before an initiation of link training. For instance, a System Management Unit (SMU) may start the link training.

In one or more embodiments, a riser may include multiple PCIe slots. For example, the riser may receive a reset signal. For instance, the reset signal may reset the multiple PCIe slots. In one or more embodiments, an information handling system may include multiple dies. For example, circuitry may aggregate reset signals from the multiple dies to the riser. For instance, aggregating the reset signals from the dies to the riser may include synchronizing the reset signals from the dies to the riser. In one or more embodiments, a first die may be coupled to a first slot of the riser, and a second die may be coupled to a second slot of the riser. For example, each of the first die and the second die may provide a first reset signal and a second reset signal, respectively, to the riser. In one instance, if the first reset signal is received before the second reset signal, a link training process and/or method that may be occurring with the first die and the first slot may be interrupted and/or corrupted when the riser receives the second reset signal from the second die. In another instance, if the first reset signal and the second reset signal are aggregated, a link training process and/or method that may be occurring with the first die and the first slot may not be interrupted and/or corrupted. In one or more embodiments, aggregating reset signals from different dies may improve performance of an information handling system by preventing configuration corruption when two different dies are coupled to two different PCIe slots of a single riser. In one or more embodiments, aggregating reset signals from different dies may improve performance of an information handling system by preventing and/or mitigating a PCIe link width downgrade or a complete PCIe link failure when two different dies are coupled to two different PCIe slots of a single riser. In one or more embodiments, a PCIe root complex may include a training enable bit that information handling system firmware may set. For example, when information handling system firmware sets the training enable bit of the PCIe root complex, the PCIe root complex may initiate PCIe link training.

Turning now to FIG. 1A, an example of an information handling system is illustrated, according to one or more embodiments. An information handling system (IHS) 110 may include a hardware resource or an aggregate of hardware resources operable to compute, process, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), SATA, a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
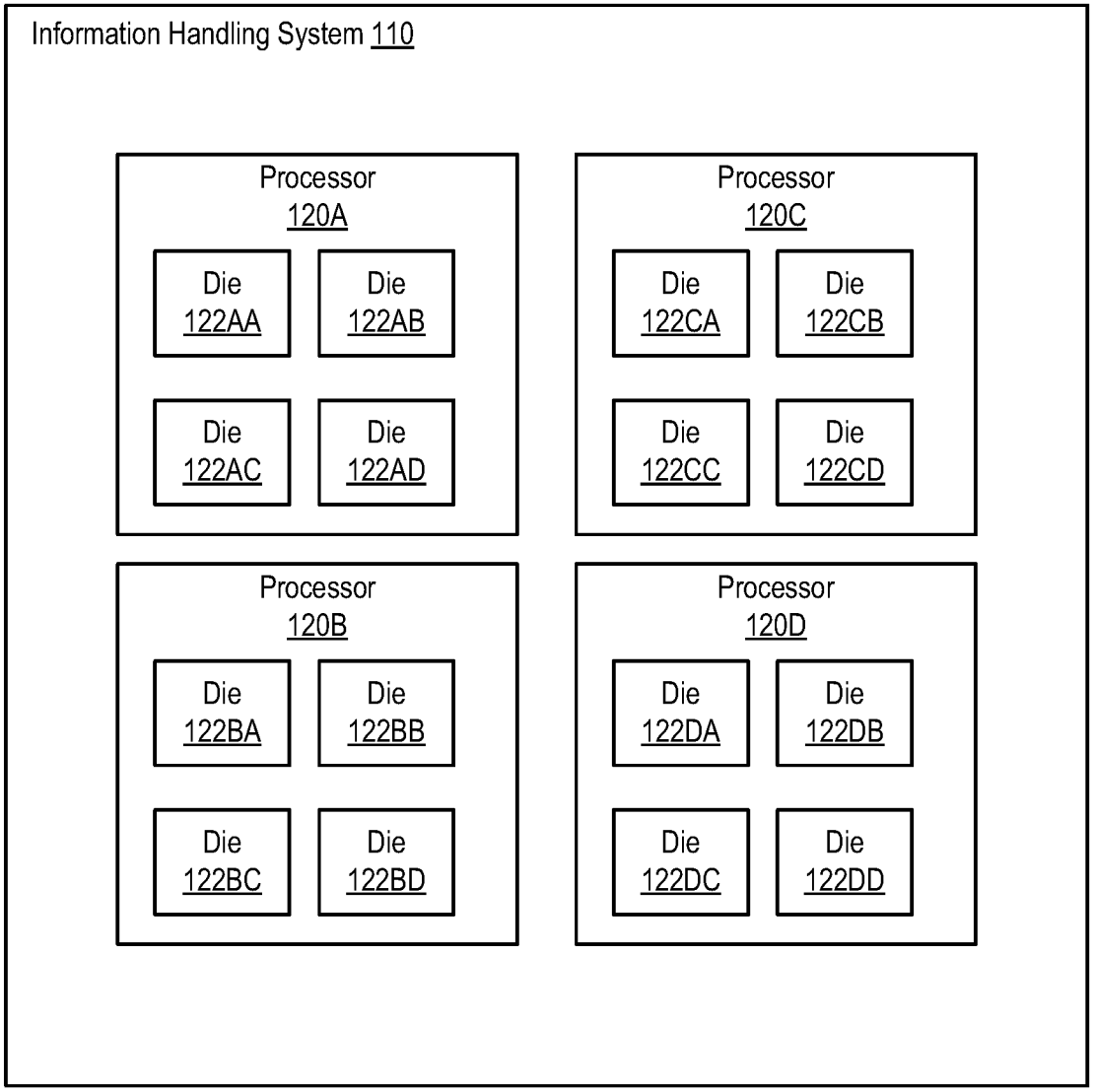
FIG. 1B illustrates a second example of an information handling system, according to one or more embodiments.

Turning now to FIG. 1B, a second example of an information handling system is illustrated, according to one or more embodiments. As shown, IHS 110 may include processors 120A-120D. In one or more embodiments, a processor 120 may include multiple dies 122. As shown, a processor 120A may include dies 122AA-122AD, a processor 120B may include dies 122BA-122BD, a processor 120C may include dies 122CA-122CD, and a processor 120D may include dies 122DA-122DD. In one or more embodiments, a die 122 may include multiple processor cores.

Figure 2:
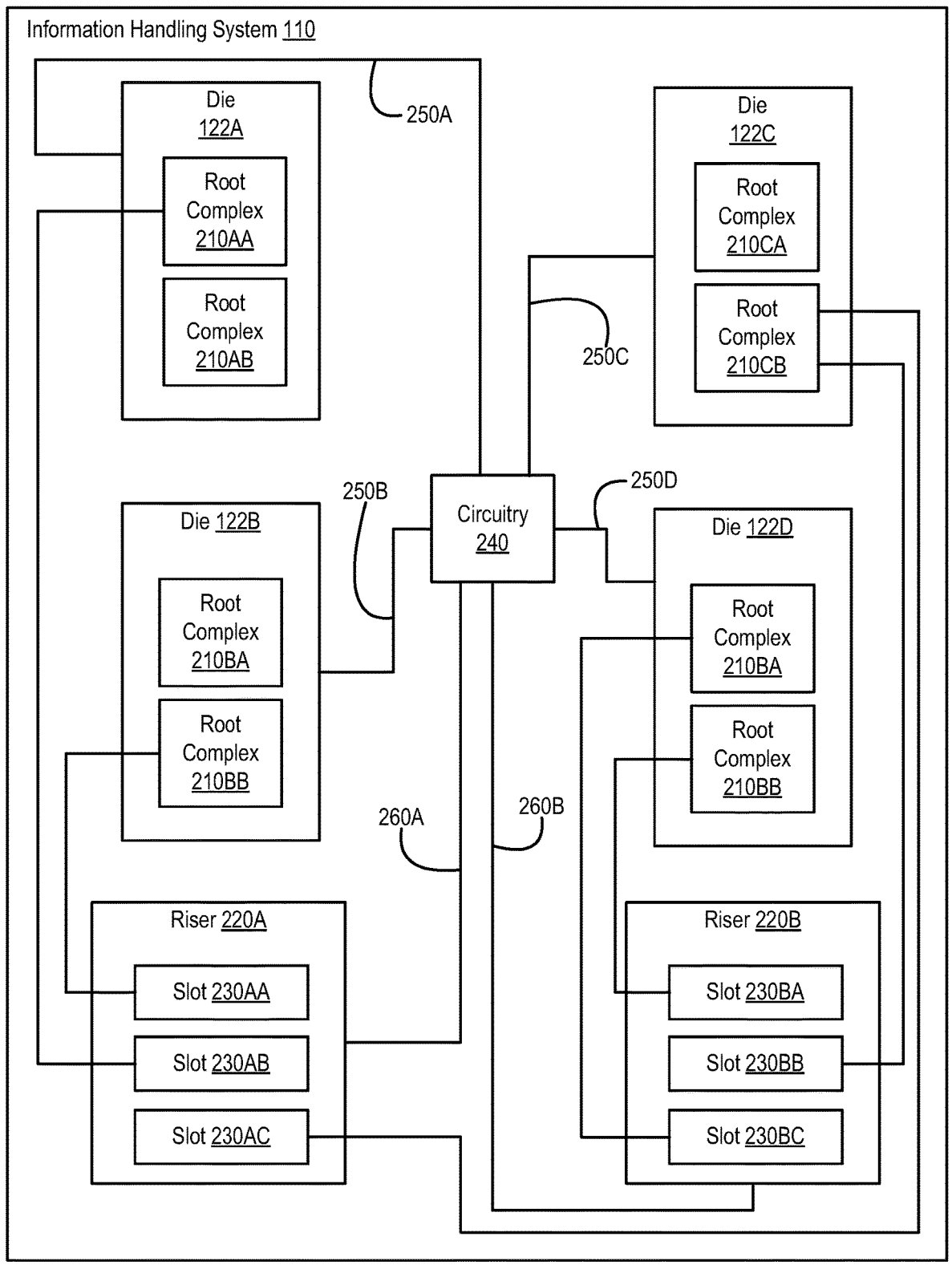
FIG. 2 illustrates another example of an information handling system that includes Peripheral Component Interconnect Express (PCIe) risers, according to one or more embodiments.

Turning now to FIG. 2, another example of an information handling system that includes PCIe risers is illustrated, according to one or more embodiments. As shown, IHS 110 may include PCIe risers 220A and 220B. As illustrated, PCIe riser 220A may include PCIe slots 230AA-230AC. As shown, PCIe riser 220B may include PCIe slots 230BA-230BC. In one or more embodiments, a die 122 may include multiple PCIe root complexes. As illustrated, die 122A may include PCIe root complexes 210AA and 210AB, die 122B may include PCIe root complexes 210BA and 210BB, die 122C may include PCIe root complexes 210CA and 210CB, and die 122D may include PCIe root complexes 210DA and 210DB. As shown, root complex 210AA may be coupled to slot 230AB. As illustrated, root complex 210BB may be coupled to slot 230AA. As shown, root complex 210CB may be coupled to slots 230BB and 230AC. As illustrated, root complex 210BA may be coupled to slot 230BA. As shown, root complex 210BB may be coupled to slot 230BC.

As illustrated, dies 122A-122D may be coupled to circuitry 240 via couplings 250A-250D, respectively. In one or more embodiments, a coupling 250 may provide a reset assertion signal or a reset de-assertion signal from a die 122 to circuitry 240, at various times. For example, circuitry 240 may aggregate reset assertion signals or reset de-assertion signals from dies 122A-122D. In one or more embodiments, a reset signal may include a PERST signal. In one example, a reset assertion signal may include a PERST assertion signal. In another example, a reset de-assertion signal may include a PERST de-assertion signal. In one or more embodiments, circuitry 240 may be or include a complex programmable logic device (CPLD). For example, a CPLD may include one or more structures and/or functionalities of a field programmable gate array (FPGA) and/or one or more structures and/or functionalities of a programmable array logic (PAL), among others. In one or more embodiments, circuitry 240 may be or include an ASIC.

Figure 3:
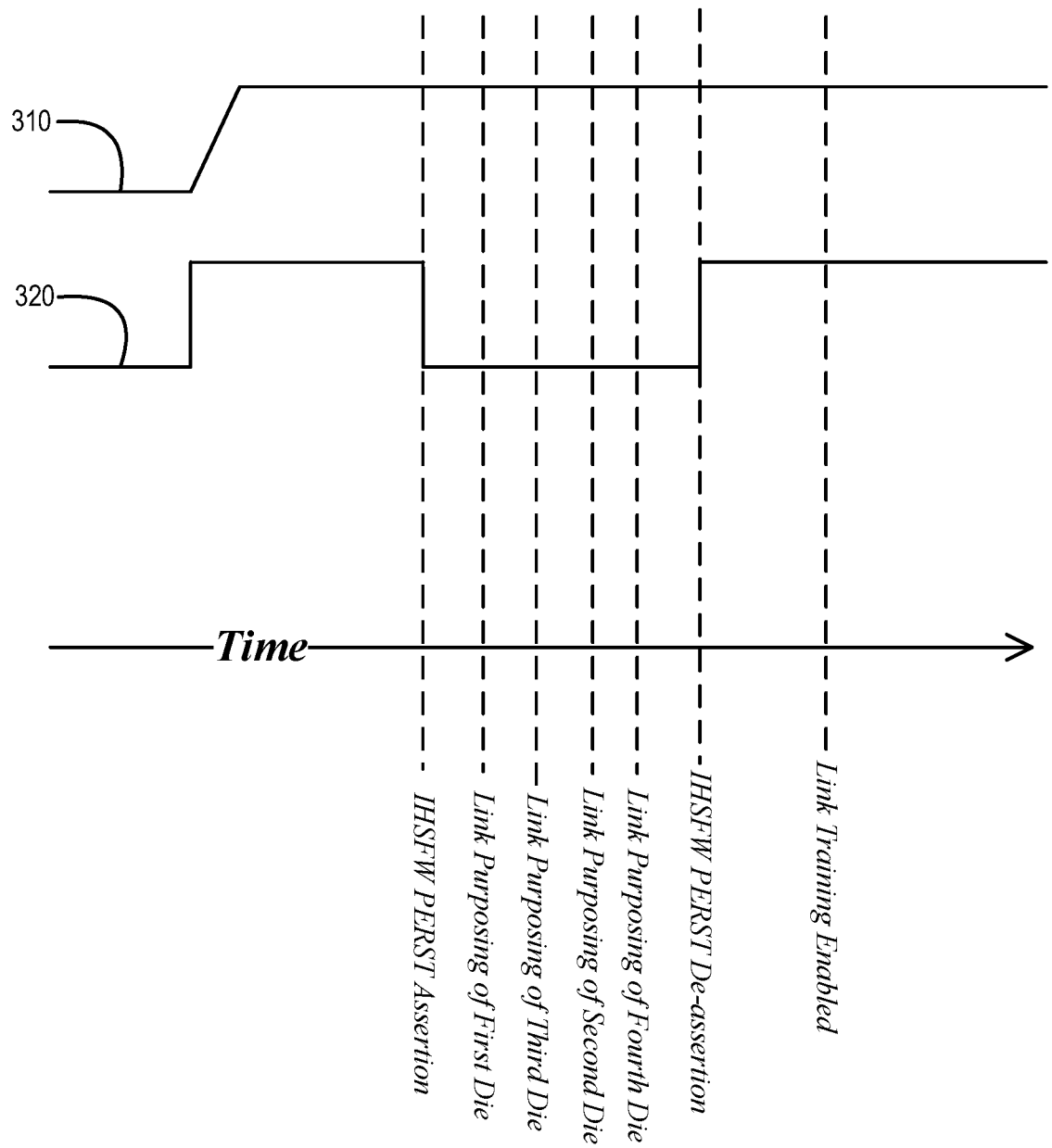
FIG. 3 illustrates an example timing diagram, according to one or more embodiments.

Turning now to FIG. 3, an example timing diagram is illustrated, according to one or more embodiments. In one or more embodiments, curve 310 may represent a power signal to IHS 110. In one or more embodiments, curve 310 may represent a reset signal. As illustrated, curve 320 may begin with the reset signal asserted. In one or more embodiments, the reset signal may be de-asserted. In one or more embodiments, the reset signal may be asserted by IHSFW 172. For example, IHSFW 172 may assert the reset signal, which may permit and/or allow each of two or more dies to perform a respective link purposing process or method.

As shown, link purposing of a first dies may occur in a first amount of time transpiring. As illustrated, link purposing of a second dies may occur in a second amount of time transpiring. As shown, link purposing of a third dies may occur in a third amount of time transpiring. As illustrated, link purposing of a fourth dies may occur in a fourth amount of time transpiring. As shown, the third amount of time transpiring may be less than the second amount of time transpiring. In one or more embodiments, each of two or more dies may start a respective link purposing process and/or method at different times. In one or more embodiments, the two or more dies may complete the respective link purposing processes and/or methods at different respective times. In one or more embodiments, after a die completes its link purposing process and/or method, the die may de-asserted a reset signal. For example, the de-asserted reset signal may be provided to circuitry 240. For instance, circuitry 240 may aggregate de-asserted reset signals from different dies.

As illustrated, IHSFW 172 may de-assert a reset signal. For example, the de-asserted reset signal may be provided to circuitry 240. In one or more embodiments, circuitry 240 may aggregate de-asserted reset signals from different dies and from IHSFW 172. After circuitry 240 receives the de-asserted reset signals from the different dies and from IHSFW 172, circuitry 240 may provide a de-asserted reset signal to one or more PCIe risers 220. In one or more embodiments, link training may be enabled after circuitry 240 provides the de-asserted reset signal to the one or more PCIe risers 220.

Figure 4:
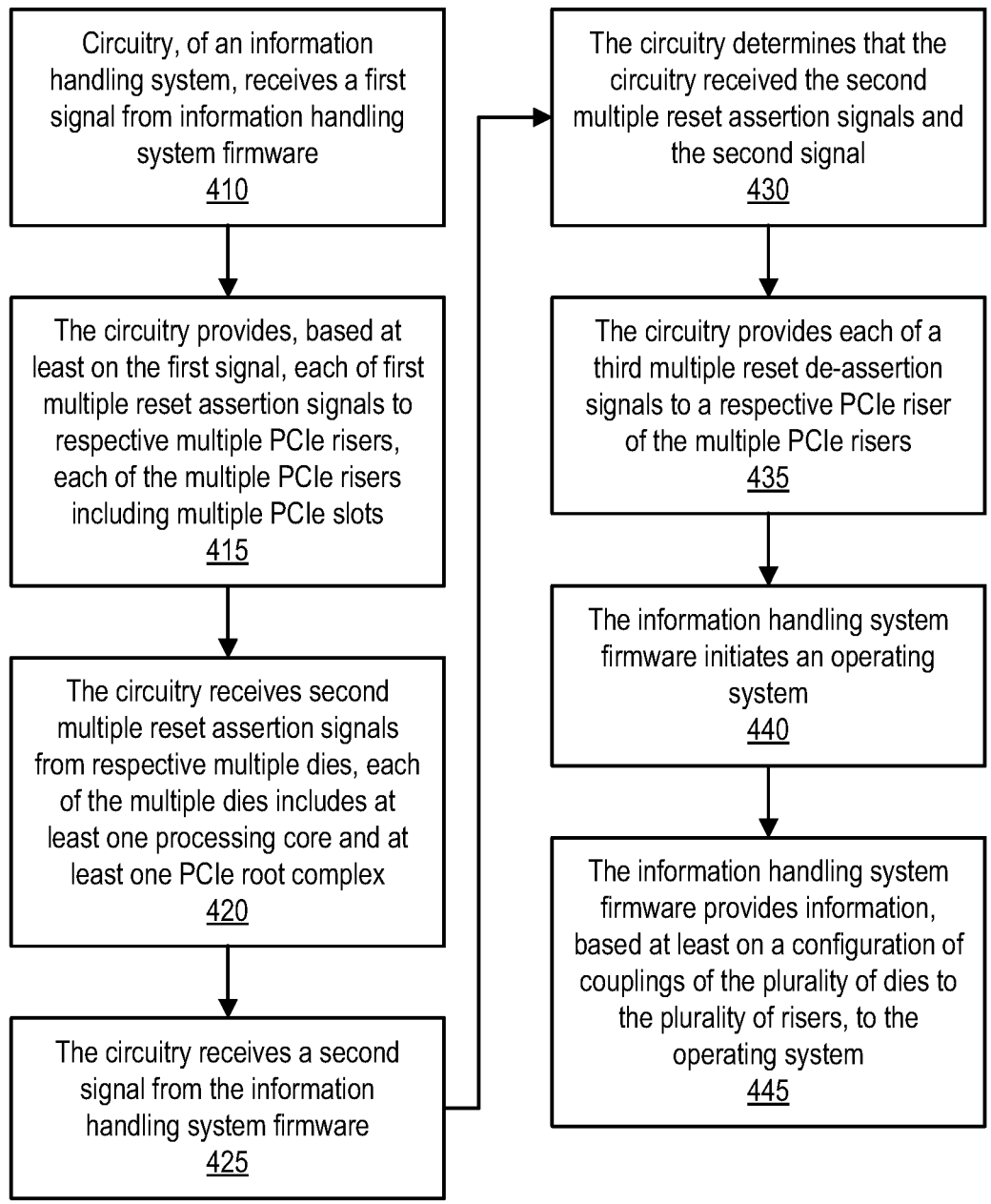
FIG. 4 illustrates an example of a method of operating an information handling system, according to one or more embodiments.

Turning now to FIG. 4, an example of a method of operating an information handling system is illustrated, according to one or more embodiments. At 410, circuitry, of an information handling system, may receive a first signal from information handling system firmware. For example, circuitry 240 may receive a first signal from IHSFW 172. For instance, the first signal may be or include a reset assertion signal. In one or more embodiments, the reset assertion signal may be or include a PERST assertion signal. In one or more embodiments, the circuitry receiving the first signal from the information handling system firmware may include the circuitry receiving information from a register of the circuitry. For example, IHSFW 172 may write information to a register of circuitry 240. For instance, circuitry 240 may receive the information via the register of circuitry 240.

At 415, the circuitry may provide, based at least on the first signal, each of first multiple reset assertion signals to respective multiple PCIe risers, each of the multiple PCIe risers including multiple PCIe slots. For example, circuitry 240 may provide, based at least on the first signal, each of first multiple reset assertion signals to respective PCIe risers 220A and 220B. For instance, the first multiple reset assertion signals may be or include first multiple PERST assertion signals. At 420, the circuitry may receive second multiple reset assertion signals from respective multiple dies, each of the multiple dies includes at least one processing core and at least one PCIe root complex. For example, circuitry 240 may receive second multiple reset assertion signals from respective two or more of dies 122A-122D. For instance, the second multiple reset assertion signals may be or include second multiple PERST assertion signals. In one or more embodiments, the circuitry may receive the second multiple reset assertion signals from the respective multiple dies at different times. For example, the circuitry may receive at least two of the second multiple reset assertion signals at respective different times. For instance, the circuitry may receive at least a first two of the second multiple reset assertion signals at different times and may receive at least a second two of the second multiple reset assertion signals at a same time.

At 425, the circuitry may receive a second signal from the information handling system firmware. For example, circuitry 240 may receive a second signal from IHSFW 172. For instance, the second signal from IHSFW 172 may be or include a reset de-assertion signal. In one or more embodiments, the reset de-assertion signal may be or include a PERST de-assertion signal. At 430, the circuitry may determine that the circuitry received the second multiple reset assertion signals and the second signal. For example, circuitry 240 may determine that the circuitry received the second multiple PERST assertion signals from the two or more of dies 122A-122D and the second signal from IHSFW 172. In one or more embodiments, circuitry 240 may aggregate the second multiple PERST assertion signals from the two or more of dies 122A-122D when circuitry 240 determines that the circuitry received the second multiple PERST assertion signals from the two or more of dies 122A-122D and the second signal from IHSFW 172. For example, aggregating the second multiple PERST assertion signals from the two or more of dies 122A-122D may include determining that the second multiple PERST assertion signals from the two or more of dies 122A-122D and the second signal from IHSFW 172 were received.

At 435, the circuitry may provide each of a third multiple reset de-assertion signals to a respective PCIe riser of the multiple PCIe risers. For example, circuitry 240 may provide each of a third multiple reset de-assertion signals to a respective PCIe riser of the PCIe risers 220A and 220B. For instance, the third multiple reset de-assertion signals may be or include multiple PERST de-assertion signals. In one or more embodiments, the circuitry may provide each of a third multiple reset de-assertion signals to a respective PCIe riser of the multiple PCIe risers after the circuitry determines that the circuitry received the second multiple signals and the second signal. At 440, the information handling system firmware may initiate an operating system. For example, IHSFW 172 may initiate OS 462

At 445, the information handling system firmware may provide information, based at least on a configuration of coupling of the multiple dies to the multiple risers, to the operating system. For example, IHSFW 172 may provide information, based at least on a configuration of coupling of the multiple dies to the multiple risers, to OS 462. In one or more embodiments, the circuitry providing each of the third multiple reset de-assertion signals to the respective PCIe riser of the multiple PCIe risers may include the circuitry substantially synchronously providing each of the third multiple reset de-assertion signals to the respective PCIe riser of the multiple PCIe risers. For example, substantially synchronously providing each of the third multiple reset de-assertion signals to the respective PCIe riser of the multiple PCIe risers may include the circuitry providing each of the third multiple reset de-assertion signals within an amount of time transpiring. In one instance, the amount of time transpiring may be a few milliseconds. In another instance, the amount of time transpiring may be a few microseconds.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    a processor;
    a memory medium that stores information handling system firmware, executable by the processor, and that is coupled to the at least one processor;
    a plurality of dies, each of the plurality of dies includes at least one processing core and at least one Peripheral Component Interconnect Express (PCIe) root complex;
    a plurality of PCIe risers, each of the plurality of PCIe risers including a plurality of PCIe slots; and
    circuitry that is coupled to the plurality of dies and coupled to the plurality of PCIe risers;
    wherein the circuitry is configured to:
        receive a first signal from the information handling system firmware executed by the processor;
        provide, based at least on the first signal, each of a first plurality of reset assertion signals to each of the plurality of PCIe risers, respectively;
        receive a second plurality of reset assertion signals from the plurality of dies, respectively;
        receive a second signal from the information handling system firmware executed by the processor;
        determine that the circuitry received the second plurality of reset assertion signals and the second signal; and
        after determining that the circuitry received the second plurality of signals and the second signal, provide each of a third plurality of reset de-assertion signals to a respective PCIe riser of the plurality of PCIe risers.

2. The information handling system of claim 1,
    wherein the circuitry includes at least one register;
    wherein, when the processor executes the information handling system firmware, the information handling system firmware causes the processor to write information to a register of the circuitry; and
    wherein, to receive the first signal from information handling system firmware, the circuitry is further configured to receive the information from the at least one register.

3. The information handling system of claim 1, wherein at least two of the plurality of PCIe slots are coupled to respective at least two root complexes of respective at least two dies of the plurality of dies.

4. The information handling system of claim 1, wherein, when the processor executes the information handling system firmware, the information handling system firmware causes the processor to:
    initiate an operating system; and
    provide information, based at least on a configuration of couplings of the plurality of dies to the plurality of risers, to the operating system.

5. The information handling system of claim 1, wherein, to provide each of the third plurality of reset de-assertion signals to each of the respective PCIe riser of the plurality of PCIe risers, the circuitry is further configured to substantially synchronously provide each of the third plurality of reset de-assertion signals to each of the respective PCIe riser of the plurality of PCIe risers.

6. The information handling system of claim 1, wherein each of the plurality of dies includes multiple processing cores.

7. The information handling system of claim 1, wherein, to receive the second plurality of reset assertion signals from the respective plurality of dies, the circuitry is further configured to receive at least two of the second plurality of reset assertion signals from the respective plurality of dies at two respective different times.

8. The information handling system of claim 1, wherein one of the plurality of dies includes the processor.

9. A method, comprising:
circuitry, of an information handling system, receiving a first signal from information handling system firmware;
the circuitry providing, based at least on the first signal, each of a first plurality of reset assertion signals to each of a respective plurality of Peripheral Component Interconnect Express (PCIe) risers, each of the plurality of PCIe risers including a plurality of PCIe slots;
the circuitry receiving a second plurality of reset assertion signals from a respective plurality of dies, each of the plurality of dies includes at least one processing core and at least one PCIe root complex;
the circuitry receiving a second signal from the information handling system firmware;
the circuitry determining that the circuitry received the second plurality of reset assertion signals and the second signal; and
after the circuitry determining that the circuitry received the second plurality of signals and the second signal, the circuitry providing each of a third plurality of reset de-assertion signals to a respective PCIe riser of the plurality of PCIe risers.

10. The method of claim 9, further comprising:
the information handling system firmware writing information to a register of the circuitry;
wherein the circuitry receiving the first signal from information handling system firmware includes the circuitry receiving the information from the register.

11. The method of claim 9, wherein at least two of the plurality of PCIe slots are coupled to respective at least two root complexes of respective at least two dies of the plurality of dies.

12. The method of claim 9, further comprising:
the information handling system firmware initiating an operating system; and
the information handling system firmware providing information, based at least on a configuration of couplings of the plurality of dies to the plurality of risers, to the operating system.

13. The method of claim 9, wherein the circuitry providing each of the third plurality of reset de-assertion signals to each of the respective PCIe riser of the plurality of PCIe risers includes the circuitry substantially synchronously providing each of the third plurality of reset de-assertion signals to each of the respective PCIe riser of the plurality of PCIe risers.

14. The method of claim 9, wherein each of the plurality of dies includes multiple processing cores.

15. The method of claim 9, wherein the circuitry receiving the second plurality of reset assertion signals from the respective plurality of dies includes the circuitry receiving at least two of the second plurality of reset assertion signals from the respective plurality of dies at two respective different times.

16. Circuitry, configured to:
receive a first signal from information handling system firmware;
provide, based at least on the first signal, each of a first plurality of reset assertion signals to each of a respective plurality of Peripheral Component Interconnect Express (PCIe) risers, each of the plurality of PCIe risers including a plurality of PCIe slots;
receive a second plurality of reset assertion signals from a respective plurality of dies, each of the plurality of dies includes at least one processing core and at least one PCIe root complex;
receive a second signal from the information handling system firmware;
determine that the circuitry received the second plurality of reset assertion signals and the second signal; and
after determining that the circuitry received the second plurality of signals and the second signal, provide each of a third plurality of reset de-assertion signals to a respective PCIe riser of the plurality of PCIe risers.

17. The circuitry of claim 16,
wherein the circuitry includes at least one register; and
wherein, to receive the first signal from information handling system firmware, the circuitry is further configured to receive the information from the at least one register.

18. The circuitry of claim 16, wherein, to provide each of the third plurality of reset de-assertion signals to each of the respective PCIe riser of the plurality of PCIe risers, the circuitry is further configured to substantially synchronously provide each of the third plurality of reset de-assertion signals to each of the respective PCIe riser of the plurality of PCIe risers.

19. The circuitry of claim 16, wherein, to receive the second plurality of reset assertion signals from the respective plurality of dies, the circuitry is further configured to receive at least two of the second plurality of reset assertion signals from the respective plurality of dies at two respective different times.

20. The circuitry of claim 16, wherein the circuitry includes a complex logic device.

* * * * *